Jan. 31, 1939.  C. W. SINCLAIR  2,145,377

VEHICLE WHEEL

Filed June 15, 1936  2 Sheets-Sheet 1

INVENTOR
CHARLES W. SINCLAIR
BY *Whittemore Hulbert Whittemore Belknap*
ATTORNEYS Jan. 31, 1939.   C. W. SINCLAIR   2,145,377
VEHICLE WHEEL
Filed June 15, 1936   2 Sheets—Sheet 2

INVENTOR
CHARLES W. SINCLAIR
BY
ATTORNEYS

Patented Jan. 31, 1939

2,145,377

UNITED STATES PATENT OFFICE 2,145,377

VEHICLE WHEEL

Charles W. Sinclair, Detroit, Mich., assignor to Kelsey-Hayes Wheel Company, Detroit, Mich., a corporation of Delaware Application June 15, 1936, Serial No. 85,389

9 Claims. (Cl. 301—9)

The invention relates to vehicle wheels and refers more particularly to that type having sheet metal wheel bodies. The invention has for one of its objects to provide the wheel with acoustic damping means for the purpose of deadening noise or rumble produced by the wheel when in operation. The invention has for another object to provide a simple construction of acoustic damper which is practically concealed by the body portion of the wheel body.

These and other objects of the invention will become apparent from the following description and claims when taken with the accompanying drawings, in which Figure 1 is a front elevation of a vehicle wheel showing an embodiment of my invention;

Figure 2:
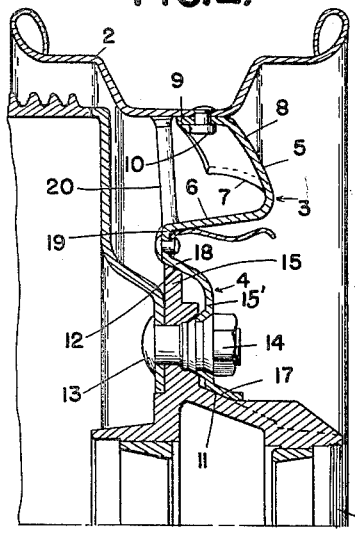
Figure 2 is a cross section on the line 2—2 of Figure 1.
Figure 1:
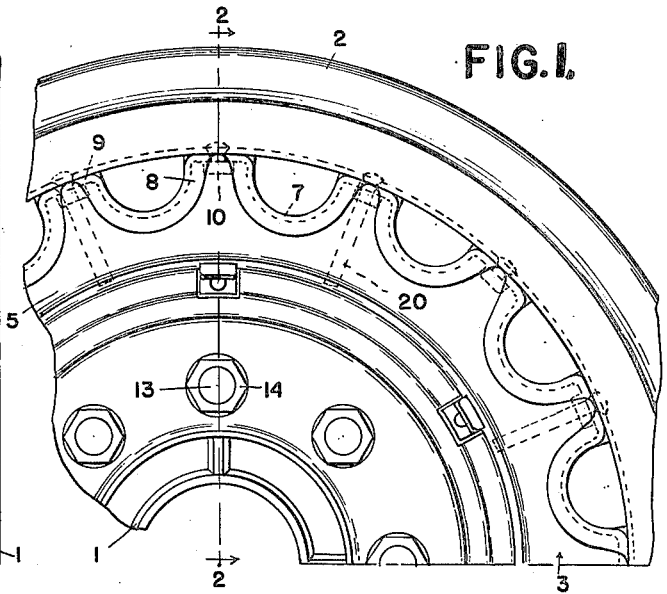

The wheel construction shown in Figures 1 and 2 comprises the hub member 1, the rim member 2 and the wheel body 3. The wheel body is a one-piece sheet metal stamping having the radially inner bolting-on flange 4, the radially outer or body portion 5 for connection to the rim member 2 and the intermediate generally axially extending annular portion 6 which connects the bolting-on flange and the radially outer or body portion. The bolting-on flange and the radially outer or body portion extend generally radially and the annular portion extends from the periphery of the bolting-on flange. The radially outer or body portion 5 has the spoke bearing or nave portion 7 radially outwardly of the annular portion 6 and the spoke portions 8 extending generally radially outwardly from the spoke bearing or nave portion. These spoke portions are of channel-shape and open axially inwardly and they are closed at their outer ends by the integral flanges 9 to which the rim member 2 is secured by suitable means, such as the rivets 10. In the present instance the rim member is a tire carrying rim of the drop-center type and the base of the well of this rim is secured to the outer ends of the spokes. The arrangement is such that the bolting-on flange 4 is axially offset inwardly relative to the axially outer end of the nave portion and is located near the median plane of rotation of the wheel.

The hub member 1 is provided with the radially inner and outer axially and radially spaced seats 11 and 12 respectively and the bolting-on flange is formed to engage these seats radially inwardly and outwardly of the part engaged by the securing means. The securing means in the present instance comprises the bolts 13 and the nuts 14. The radially inner seat is preferably a beveled seat formed upon the barrel of the hub and the radially outer seat is preferably a beveled seat which is formed upon the periphery of the radially extending fixed flange 15 of the hub, this flange being located axially inwardly of the radially inner seat. The bolting-on flange is formed with a flexible radially extending part 15' and with the radially inner and outer seating parts 17 and 18 respectively. These latter parts extend generally axially, but are inclined to fit their respective beveled seats upon the hub. The annular portion 6 connects into the radially outer seating part 18 by the return-bend 19, which forms part of the bolting-on flange. The parts are so arranged that the median plane of rotation of the wheel body is near the zone of the seats 11 and 12 and, as shown, passes axially therebetween.

For the purpose of deadening noise or rumble produced by the wheel when in operation, I have provided acoustic damping means comprising the series of wire spokes 20, which extend generally radially from the annular portion 6 to the base of the well of the rim member 2. These spokes are connected to both the annular portion and the rim by suitable means and in the present instance are butt-welded thereto. Each of the spokes is connected to the annular portion adjacent its junction to the bolting-on flange and in substantially the radial plane of the radial outer seats of the hub. The spokes are connected to the rim base axially inwardly of the flanges 9 at the outer ends of the spokes 8 of the wheel body. It will be noted that the spokes 20 are in axial registration with and axially inwardly of certain of the spokes 8, there being in the present instance half as many spokes 20 as 8. The wheel body 3 is adapted to carry all of the wheel load, but by reason of the arrangement of the acoustic damping spokes 20, these latter carry part of the wheel load. It has been found in actual practice that these spokes 20 sufficiently eliminate the noise or rumble produced by the sheet metal wheel body so that the wheel with these spokes is relatively quiet in operation.

Figure 3:
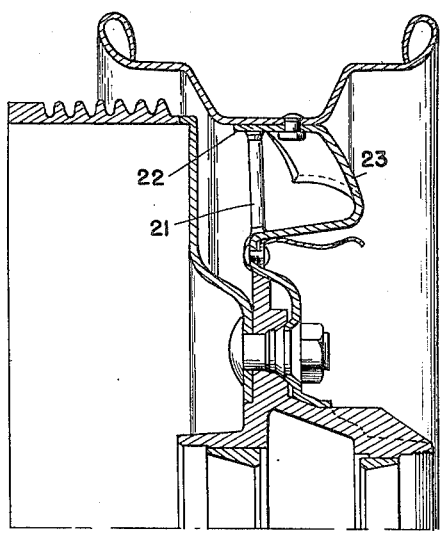
Figure 3 is a view similar to Figure 2 showing another embodiment of my invention.

In the modification illustrated in Figure 3, the same general arrangement of parts is present, but the radially outer ends of the acoustic damping spokes 21 are secured directly to the flanges 22 closing the outer ends of the spokes 23 of the sheet metal wheel body.

Figure 4:
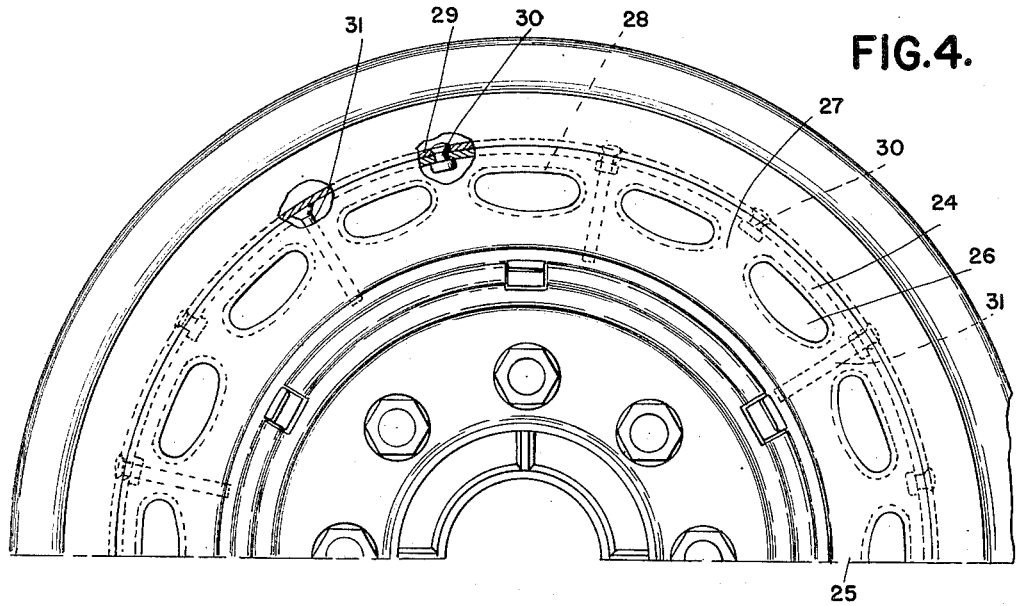
Figures 4 and 5 are front elevations showing other embodiments of my invention.

Figure 4 illustrates another embodiment of my invention in which the radially outer or body portion 24 of the sheet metal wheel body 25 has the annular series of openings 26 formed therein to form in effect spoke portions 27 integrally connected at their radially outer ends. The metal surrounding the openings is preferably depressed axially inwardly to form flanges 28. The periphery of this sheet metal wheel body is provided with a continuous annular flange which is adapted to be secured to the rim member 29 by suitable means, such as the rivets 30. The acoustic damping spokes 31 are connected to the wheel body and the rim member in the same manner as the spokes 20 and are in axial alignment with alternate spoke portions 27.

Figure 5:
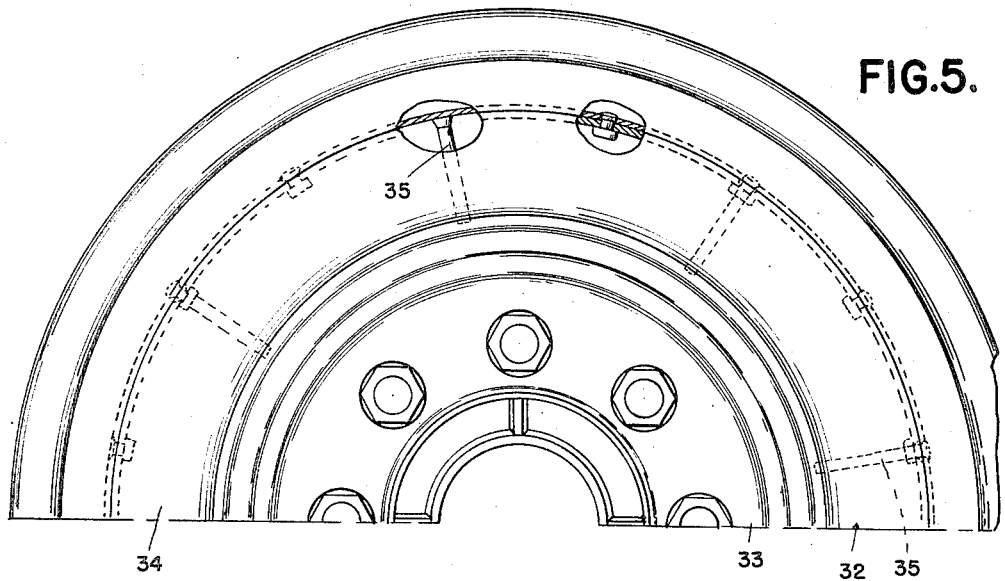

Figure 5 discloses another modification in which the sheet metal wheel body 32 is a solid disk having its bolting-on flange 33 axially offset inwardly relative to the axially outer end of the radially outer or body portion 34. In this construction, the acoustic damping spokes 35 are angularly spaced and secured to the sheet metal wheel body and the rim member in substantially the same manner as the spokes 20.

What I claim as my invention is:

1. A vehicle wheel of the demountable bolted-on type, comprising a hub member, a rim member and a wheel body forming the sole connection between said hub and rim members, said wheel body comprising a single stamping having a substantially radially extending bolting-on flange, an annular portion extending generally axially rearwardly from said bolting-on flange, a portion extending generally radially outwardly from said annular flange, a second annular portion extending generally axially forwardly from said last-mentioned radially extending portion, a spoke bearing portion generally radially outwardly of and extending from said second annular portion and spokes extending generally radially outwardly from said spoke bearing portion, said wheel body also comprising acoustic damping spokes secured to said second annular portion and extending generally radially outwardly therefrom.

2. A vehicle wheel, comprising a wheel body having a generally radially extending bolting-on flange, an annular portion extending generally axially rearwardly from the periphery of said bolting-on flange, an annular portion extending generally axially forwardly from the annular portion aforesaid and connected thereto by a radially extending portion, a body portion extending generally radially outwardly from said axially forwardly extending annular portion and adapted to carry the wheel load to a rim member, and acoustic damping means extending generally radially outwardly from said axially forwardly extending annular portion.

3. A vehicle wheel, comprising a wheel body having a bolting-on flange, an annular portion extending from said bolting-on flange and provided with a generally axially extending seat for engaging a hub, a generally axially extending annular portion radially outwardly of said first-mentioned annular portion and a body portion extending generally radially outwardly from said axially extending annular portion and adapted to carry the wheel load to a rim member, and acoustic damping means secured to said wheel body in a zone adjacent to a radial plane passing through said seat and extending generally radially inwardly.

4. A vehicle wheel, comprising a wheel body having a generally radially extending bolting-on flange, a generally axially extending annular portion radially outwardly of said bolting-on flange and a body portion extending generally radially outwardly from said annular portion and adapted to be secured directly to a rim member, and acoustic damping means secured to said annular portion and extending generally radially outwardly therefrom and adapted to be secured to the rim member.

5. A vehicle wheel, comprising a wheel body having a generally radially extending bolting-on flange, an annular portion extending generally axially rearwardly from the periphery of said bolting-on flange, an annular portion extending generally axially forwardly from the first-mentioned annular portion and connected thereto by a radially extending portion, a body portion having spoke portions extending generally radially outwardly from said second-mentioned annular portion and adapted to carry the wheel load to a rim member, and acoustic damping means secured to said wheel body in a zone adjacent to the junction of said radially extending portion and said second-mentioned annular portion, said acoustic damping means extending generally radially outwardly from said junction in substantially axial registration with certain of said spoke portions and adapted to carry part of the wheel load to the rim.

6. A vehicle wheel, comprising a hub member having a generally axially extending seat, a rim member encircling the hub member, a wheel body connecting the hub and rim members, said wheel body comprising a single stamping of sufficient strength to suppport the wheel loads and having a substantially radially extending bolting-on flange, an annular portion extending generally axially rearwardly from the periphery of the bolting-on flange and engageable with said seat, an annular portion extending generally axially forwardly from the annular portion aforesaid and connected thereto by means of a radial portion disposed in a radial plane passing through said seat, a portion extending generally radially outwardly from the forwardly extending axial portion and adapted to carry the rim member, and acoustic damping spokes having the radially inner ends secured to the generally axially forwardly extending portion in the radial plane of the connecting portion aforesaid and extending radially outwardly therefrom.

7. A vehicle wheel, comprising a hub member, a rim member encircling the hub member, a wheel body comprising a single stamping connecting the hub and rim members and having a generally radially extending bolting-on flange for attachment to said hub member, said wheel body also having a generally radially extending body portion secured at its radially outer periphery to said rim and terminating at its radially inner periphery in an annular portion extending generally axially rearwardly therefrom and connected to the bolting-on flange, and damping spokes secured to said annular portion and extending generally radially outwardly therefrom.

8. A vehicle wheel, comprising a hub member, a rim member encircling the hub member, a wheel body comprising a single stamping connecting the hub and rim members and having a generally radially extending bolting-on flange for attachment to said hub member, said wheel body also having a generally radially extending body portion secured at its radially outer periphery to said rim and terminating at its radially inner periphery in an annular portion extending generally axially rearwardly therefrom, a return-bend portion connecting said annular portion to said bolting-on flange, and spokes extending radially outwardly from the junction of said return-bend portion and said annular portion.

9. A vehicle wheel, comprising a hub member having a generally axially extending seat, a rim encircling said hub member, a wheel body comprising a generally radially extending bolting-on flange adapted to be secured to said hub member, a generally radially extending body portion connected at its radially outer periphery to said rim member and terminating at its radially inner periphery in an annular portion extending axially rearwardly therefrom, a return-bend portion connecting said annular portion and said bolting-on flange and engageable with said seat on said hub member, and acoustic damping means secured to the annular portion in the radial plane of said seat and extending radially outwardly therefrom.

CHARLES W. SINCLAIR.